(12) United States Patent
Huang et al.

(10) Patent No.: US 7,025,275 B2
(45) Date of Patent: Apr. 11, 2006

(54) EXTERNAL CONNECTING ELECTRONIC APPARATUS

(75) Inventors: Tzu-Ling Huang, Taipei (TW); Hsiao-Li Peng, Taipei (TW); Li-Li Kao, Taipei (TW); Yu-Hsin Chuo, Taipei (TW)

(73) Assignee: Micro-Star Int'l Co. Ltd., Taipei (TW)

( * ) Notice: Subject to any disclaimer, the term of this patent is extended or adjusted under 35 U.S.C. 154(b) by 150 days.

(21) Appl. No.: 10/764,545

(22) Filed: Jan. 27, 2004

(65) Prior Publication Data

US 2005/0161513 A1   Jul. 28, 2005

(51) Int. Cl.
*G06K 7/00* (2006.01)

(52) U.S. Cl. ................................................. 235/486
(58) Field of Classification Search ............... 235/486; 312/9.1
See application file for complete search history.

(56) References Cited

U.S. PATENT DOCUMENTS

| 6,411,365 | B1 | 6/2002 | Takeishi |
| 6,435,409 | B1 | 8/2002 | Hu |
| 6,456,500 | B1 | 9/2002 | Chen |
| 6,490,163 | B1 | 12/2002 | Pua et al. |
| 6,522,534 | B1 | 2/2003 | Wu |
| 6,544,075 | B1 | 4/2003 | Liao |
| 6,567,273 | B1 | 5/2003 | Liu et al. |
| 6,612,853 | B1 | 9/2003 | Wu |
| 6,612,874 | B1 | 9/2003 | Kunz et al. |
| 6,648,224 | B1 | 11/2003 | Lee |
| 6,808,400 | B1 * | 10/2004 | Tu ............................. 439/131 |
| 2003/0045176 | A1 | 3/2003 | Liu |

* cited by examiner

*Primary Examiner*—Karl D. Frech
*Assistant Examiner*—Lisa M. Caputo
(74) *Attorney, Agent, or Firm*—Birch, Stewart, Kolasch & Birch, LLP

(57) ABSTRACT

An external connecting electronic apparatus includes a case body, a connector and a cap plate. The connector and the cap plate are pivotally coupled on the case body in a movable manner. The connector has at least a hidden position in the case body for storing and a connecting position outside the case body. The cap plate has at least a masked position for covering the case body and an open position extending outwards. The cap plate corresponds to a free end of the connector. Thus when the cap plate is pushed, the connector may be moved at the same time.

21 Claims, 14 Drawing Sheets

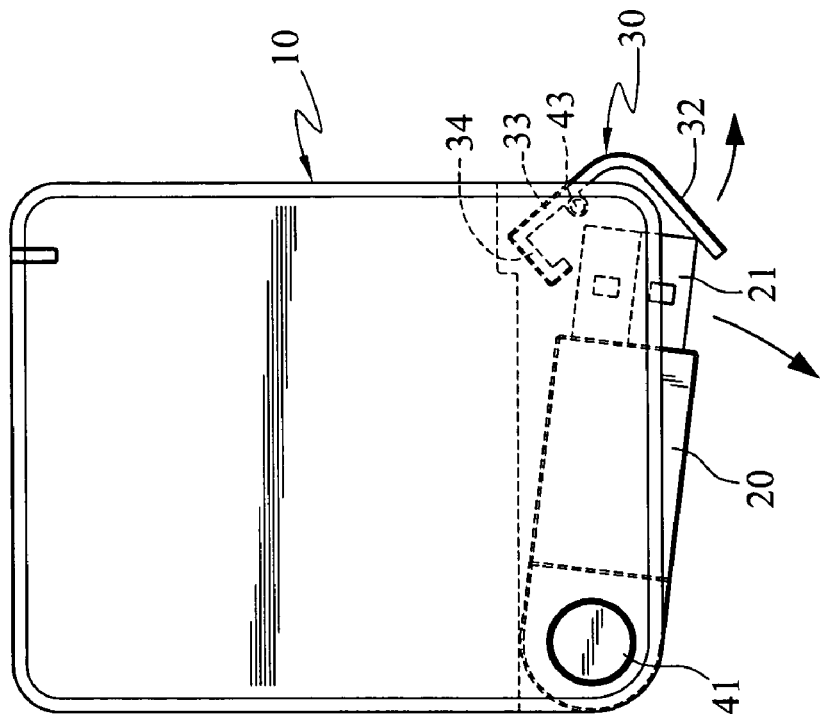
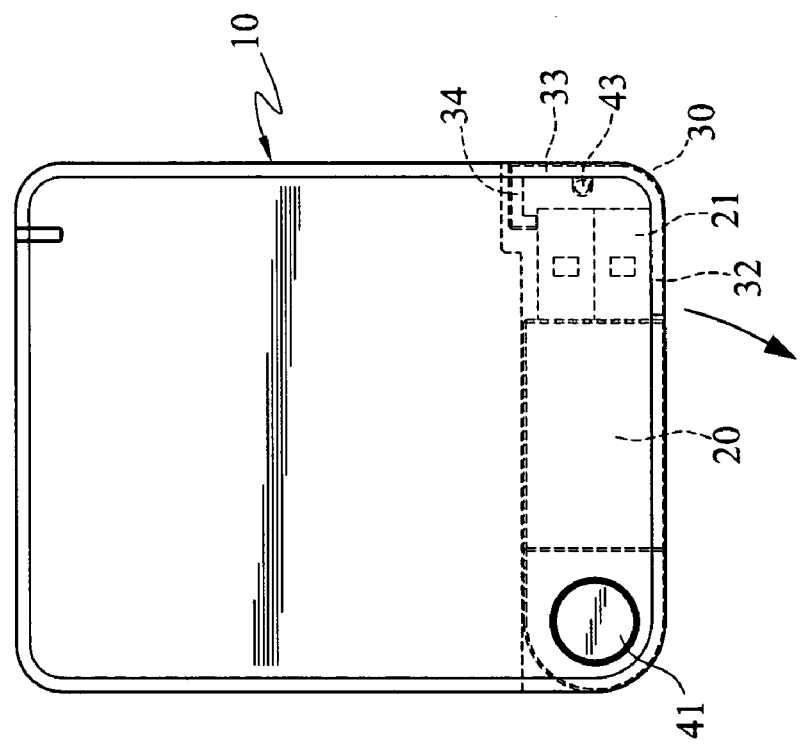

EXTERNAL CONNECTING ELECTRONIC APPARATUS

FIELD OF THE INVENTION

The present invention relates to an external connecting electronic apparatus serving as a peripheral device connecting to a computer and particularly to a mechanism for linking the peripheral device to the computer.

BACKGROUND OF THE INVENTION

With advances of technology development, a wide variety of storage media have been introduced. The portable disk is one of them. Portable disks generally can be divided into two types: one type uses flash memory as the mobile disk of the storage medium, another type uses a 2.5 inches hard disk to form a portable hard disk of the storage medium. Both of them generally adopt the Universal Serial Bus (USB) as the data transmission interface. The USB has fast transmission speed and is plug-and-play. It is becoming a very popular data transmission interface at present. Hence the portable disk can easily be connected to a computer to transmit data. As the portable disk has a small size and huge storage capacity, it is becoming a widely used storage medium.

The conventional portable disk that uses USB as the transmission interface has a male connector on the disk end, while the computer end has a female connection port. Hence to connect the computer end, the connector of the portable disk has to be extended outwards. The extended connector tends to be smeared by external objects or gather dust when not in use. As a result, the electric characteristics of the connector might be affected. The extended connector also is not convenient for storing. Moreover, the computer end generally has a plurality of connection ports located thereon in a juxtaposed manner. The connector of the portable hard disk usually is fixed. Connecting two or more portable hard disks results in interference and connecting to the computer cannot be done smoothly.

To avoid the foregoing problems, many approaches have been provided in the prior patents. For instance, U.S. Pat. No. 6,522,534 discloses a pen-type portable memory device which includes a case and a connector exposed outside the case. Since the connector is exposed, it provides a cap to couple with the case. When not in use, the connector is protected and isolated from exterior dust. However, the case and the cap are separated items, hence the cap could be lost inadvertently.

U.S. Pat. Nos. 6,456,500 and 6,612,853 disclose a portable memory device. They include an inner case to house electronic elements and an outer case connecting to the inner case. The outer case is movably located on the inner case. When in use, the outer case can be moved to shorten the distance with the inner case so that a connector fixedly located on one end of the inner case can be exposed to connect to a computer. When not in use, the outer case can be moved to increase the distance from the inner case for housing the connector. As the outer case is coupled on the inner case, it can be secured without lost. Moreover, the connector is housed in the outer case when not in use, and the connector is protected. It is easy to carry and store. However, the outer case has an opening corresponding to the connector, external dirt and duststill can enter the connector through the opening and affect the electric characteristics of the connector.

U.S. Pat. No. 6,435,409 discloses a card reader structure that has a case and a connector. The connector is located in the case in a turning manner. Its axis is horizontal relative to the case. The case may be turned relative to the connector in the axial direction. When linking to a connection port of a computer, the case can be turned about the connector which serves as the axis to change the location of the insertion slot of the memory card. While it is easier for users to connect the memory card, the connector is exposed and not desirable for storing.

U.S. Pat. Nos. 6,411,365, 6,544,075 and 6,612,874 disclose an external antenna type connector structure. The connector is located in a case in a turning manner. The axial direction of the connector is horizontal in the case. The case can be turned about the connector, which serves as the axis. However, the connector is exposed, and not desirable for storing.

U.S. patent publication No. 20030045176 discloses a means having rotating connector for electronic appliance. The connector is encased in a rotary shaft. The electronic device is coupled on the rotary shaft in a turning manner. The axis is horizontal to the electronic device. Hence the electronic device may be turned about the connector, which serves as the axis. However, the connector also is exposed and not desirable for storing.

U.S. Pat. No. 6,490,163 discloses a portable disk structure that includes a case for housing electronic elements and a connector exposed outside the case. The connector is located in the case in a turning manner. The axis is normal to the case. Hence the case is turnable about the connector in the radial direction. However, the connector is exposed and not desirable for storing.

U.S. Pat. No. 6,567,273 discloses a small silicon disk card with a USB plug that includes a magnetic disk card and a connector housed in the magnetic disk card. The connector is movably located in the magnetic disk card and can be moved outwards or retracted inwards. However, the magnetic disk card has an opening corresponding to the connector. Hence external dirt or dust tend to enter the connector through the opening and affect the electric characteristics of the connector.

U.S. Pat. No. 6,648,224 discloses a card reader structure, which includes a card reader and a connector. The connector is coupled on the card reader through a connection line. The card reader has a housing trough for storing the connector and the connection line.

All the patent references set forth above have adopted USB as the transmission interface. The design of a hidden or rotary connector may be applied on the peripheral devices connecting to the computer. However, all the patent references mentioned above divide the hidden and rotary portions into two separated portions. They are not the optimal design for the peripheral devices and the connector.

SUMMARY OF THE INVENTION

The conventional peripheral devices such as the portable disks and connectors in which the connectors either have a hidden or a rotary design, while not coupling the hidden and rotary designs together. So there is still room for improvement. Therefore the present invention aims to provide an external connecting electronic apparatus that couples both the hidden and the rotary designs.

The external connecting electronic apparatus according to the present invention includes a case body, a connector and a cap plate. The case body has a housing compartment. The connector is pivotally coupled on one end of the housing compartment in a turning manner, so that the connector has at least one hidden position completely stored in the housing compartment and a connecting position moved out of the housing compartment. The cap plate is pivotally coupled on another end of the housing compartment in a turning manner so that the cap plate has at least one masked position covering the case body and one open position extended outwards. The cap plate corresponds to a free end of the connector so when the cap plate is pushed from the masked position to the open position, the connector is pushed to escape the stored position and moved to the connecting position.

According to the external connecting electronic apparatus of the present invention, the hidden and rotary designs coexist on the case body. At the hidden position, the connector is completely stored in the case body and protected to facilitate carrying and storing. Meanwhile, the cap plate also is at the masked position to prevent external dirt or dust from entering the connector and protect the electric characteristics of the connector. When the cap plate is pushed and moved, the connector can also be moved at the same time. Therefore, users can easily perform the operations of moving the connector to the hidden position or outwards to the connecting position. It is convenient. In addition, the rotary design of the connector enables the connector to be altered to a desired location relative to the case body after the connector has been connected to a computer, to achieve an optimal connection relationship, or prevent interference with other peripheral devices.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 3A through 3D are schematic views of the first embodiment of the invention in operating condition.

DESCRIPTION OF THE PREFERRED EMBODIMENTS

The present invention is an external connecting apparatus, particularly an external electronic apparatus for linking to a computer in which the computer can be electronic data processing equipment. For example: a desktop computer, notebook computer, handheld computer or personal digital assistant. The external connecting electronic apparatus can be a portable peripheral device such as a portable storage medium, external antenna, card reader and the like. The invention mainly aims to provide a connection design for peripheral devices and electronic data processing equipment. The electronic data processing equipment has a plurality of connection ports. The peripheral device has a connector. The most commonly used transmission specification of the connector on peripheral devices at present is the Universal Serial Bus (USB). In the following description, the connector with USB specifications is used in the embodiments. It is to be noted that the techniques provided by the invention can also be adapted to the connectors of other transmission specifications.

Figure 1:
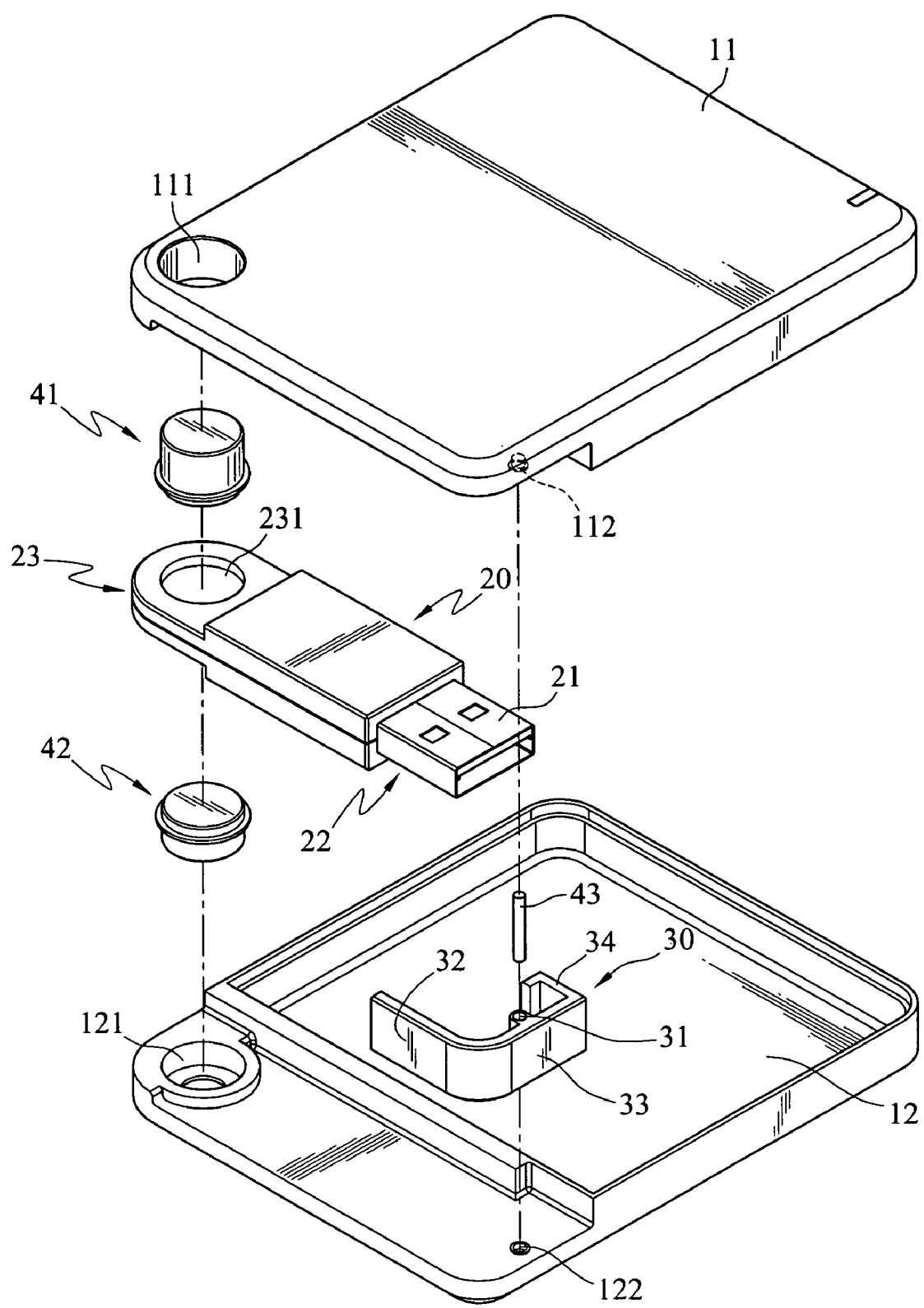
FIG. 1 is an exploded view of a first embodiment of the invention.
Figure 2:
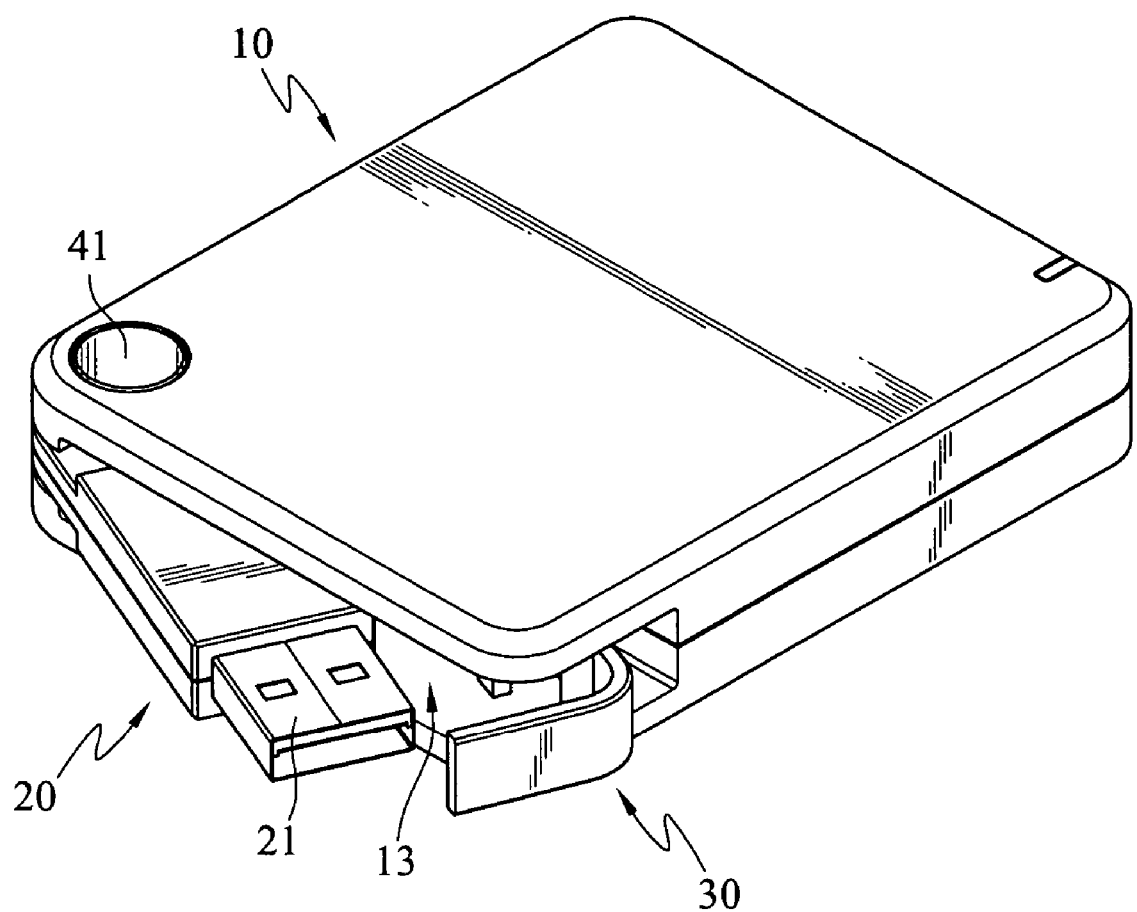
FIG. 2 is a perspective view of the first embodiment of the invention.

Refer to FIGS. 1 and 2 for a first embodiment of the invention. The external connecting electronic apparatus according to the present invention includes a case body 10, a connector 20 and a cap plate 30. The case body 10 consists of an upper shell 11 and a lower shell 12, that are coupled together for housing electronic elements (not shown in the drawings) to provide required functions. FIG. 2 illustrates that the electronic element housed in the case body 10 is a small portable hard disk. The case body 10 has a housing compartment 13 formed on one side thereof. The upper shell 11 and the lower shell 12 have one end corresponding to the housing compartment 13 that have respectively a pivot hole 111 and 121 formed thereon. Another end thereof corresponding to the pivot holes 111 and 121 has a pivot seat 112 and 122.

Figure 3C:
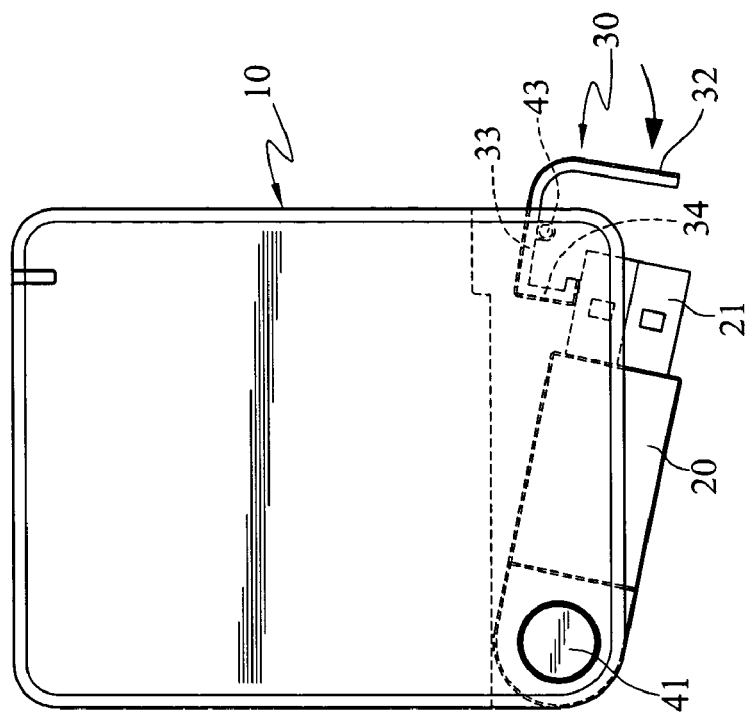
Figure 3D:
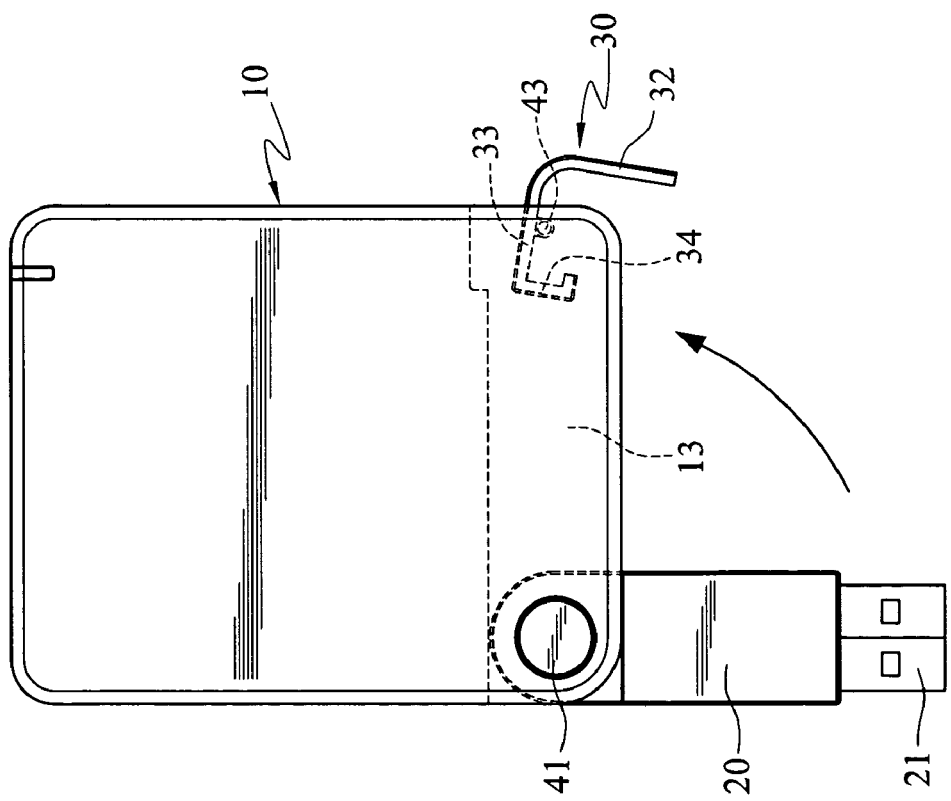

The connector 20 is substantially a rectangular member matching the housing compartment 13 of the case body 10. The connector 20 has an electric plug 21 on one end conforming to the USB transmission specifications, and a signal line (not shown in the drawings) in the interior thereof that also conforms to the USB transmission specifications to connect electrically to the electronic elements in the case body 10. As a result, the electronic elements in the case body 10 can be connected electrically to the computer through the electric plug 21 and the signal line. The end of the connector 20 at the electric plug 21 is defined as a free end 22. The other end of the connector 20 has coupling troughs 231 located on an upper side and a lower side (only the upper side is shown in the drawings, the lower side corresponds to the upper side). This end is defined as a pivotal connection end 23. The pivotal connection end 23 corresponds to the pivot holes 111 and 121 of the case body 10. A pair of axles 41 and 42 run through the pivot holes 111 and 121 to couple on the coupling troughs 231 so that the connector 20 may be turned about the axles 41 and 42. The connector 20 can be completely housed and stored in the housing trough 13 that is defined as a hidden position (referring to FIG. 3A). Further, it can be turned and moved out from the housing trough 13 to enable the electric plug 21, to be connected to the connection port (not shown in the drawings) of the computer at a connecting position (referring to FIG. 3B). Because of the restriction of the housing compartment 13, the connector 20 can be turned about 180 degrees. The connecting position of the connector 20 is in a range of about 120 degrees, where the electric plug 21 is moved away from the housing compartment 13.

Referring to FIG. 3A, the cap plate 30 is formed substantially in an L-shape. It has a pivot hole 31 and a second plate 33 on the side where the pivot hole 31 is located, and a first plate 32 on another side thereof. The second plate 33 is extended to form a bucking section 34. The cap plate 30 is located in the housing compartment 13 corresponding to the pivot seats 112 and 122, and is turning about an axle 43 which runs through the pivot hole 31 of the cap plate 30 and are coupled on the pivot seats 112 and 122. The first plate 32 and the second plate 33 of the cap plate 30 that cover the case body 10 are defined as a masked position (referring to FIG. 3A). The first plate 32 is turned outwards and the second plate 33 is turned inwards. This is defined as an 'open position'. Moreover, the first plate 32 of the cap plate 30 corresponds to the free end 22 of the connector 20. Namely, the first plate 32 corresponds to the electric plug 21. When the cap plate 30 is turned and the first plate 43 is turned to the open position, the bucking section 34 of the second plate 33 rams the electric plug 21 and pushes the connector 20. When the connector 20 is moved to the hidden position, the electric plug 21 also pushes the bucking section 34 to move the cap plate 30.

Referring to FIGS. 3A through 3D, the connector 20 and the cap plate 30 are pivotally coupled on the case body 10 in a turning manner. The cap plate 30 corresponds to the free end 22 of the connector 20. When not in use, the connector 20 is located at the hidden position, and the cap plate 30 is located at the masked position, so that the connector 20 is completely stored in the housing compartment 13, and the cap plate 30 covers the case body 10. Hence the case body 10 forms a smooth and neat appearance to facilitate carrying and storing. The electric plug 21 of the connector 20 also is covered by the first plate 32, thus external dirt or dust may be blocked away without entering the electric plug 21 and affecting the electric characteristics of the connector 20. When there is a desire to connect the external electronic apparatus to the computer, push the second plate 33 of the cap plate 30 towards the interior of the housing compartment 13. The first plate 32 of the cap plate 30 is turned outwards to the open position, and the bucking section 34 of the second plate 33 rams the electric plug 21 and pushes the connector 20, so that the connector 20 is also moved to the connecting position. When the electric plug 21 completely escapes the housing compartment 13, the connector 20 can be turned and adjusted to connect to the computer. The electric plug 21 can be connected to the connection port of the computer. Meanwhile, the case body 10 can also be turned about the connector 20 to be altered at a desired position. When the electric plug 21 is removed from the connector port, the connector 20 can be turned to the hidden position. When the electric plug 21 is in contact with the first plate 32 of the cap plate 30, the cap plate 30 can be pushed back to the masked position.

As the connector 20 and the cap plate 30 are located on the case body 10 together in a turning manner, push the cap plate 30, the connector 20 can be moved as well, hence users can easily complete the motion of moving out the connector 20. Moving the connector 20 back to the housing trough 13 also can move the cap plate 30 simultaneously, so that users can easily complete the operations of returning the connector 20 and the cap plate 30.

Figure 4B:
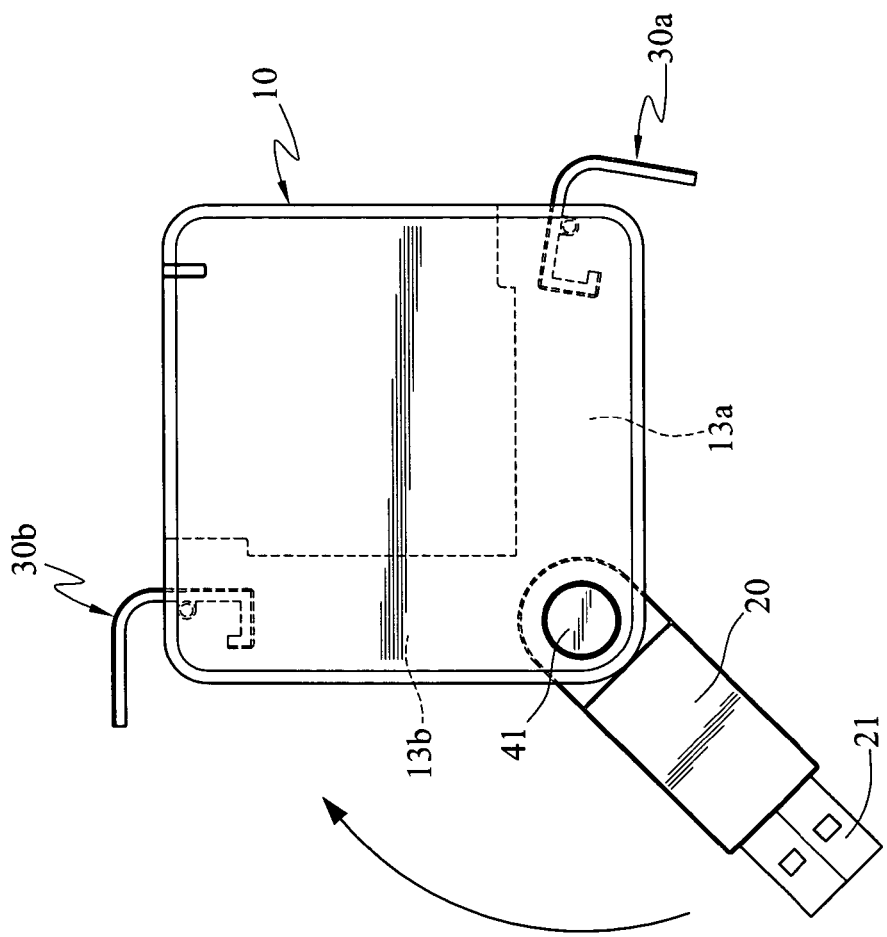
FIGS. 4A, 4B and 4C are schematic views of a second embodiment of the invention in operating condition.
Figure 4A:
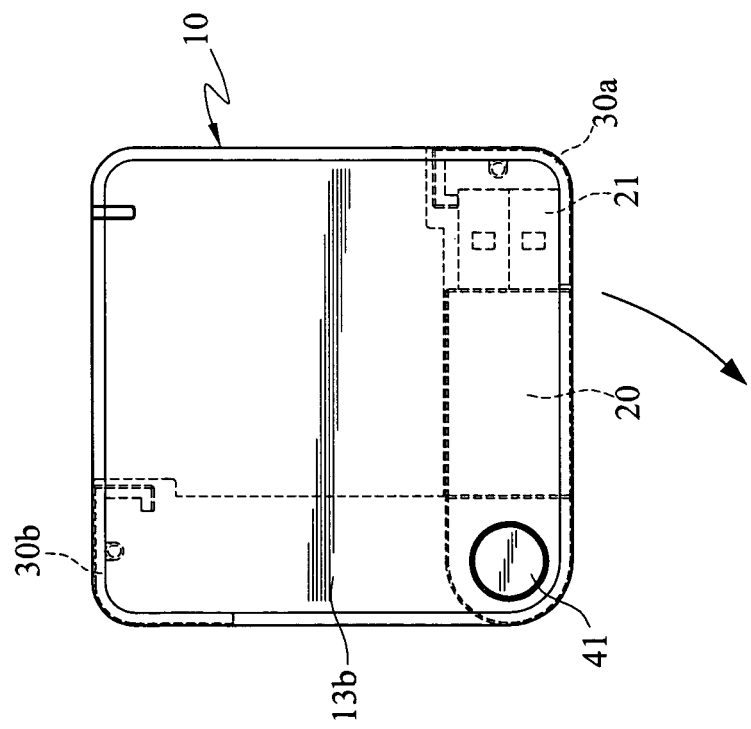
Figure 4C:
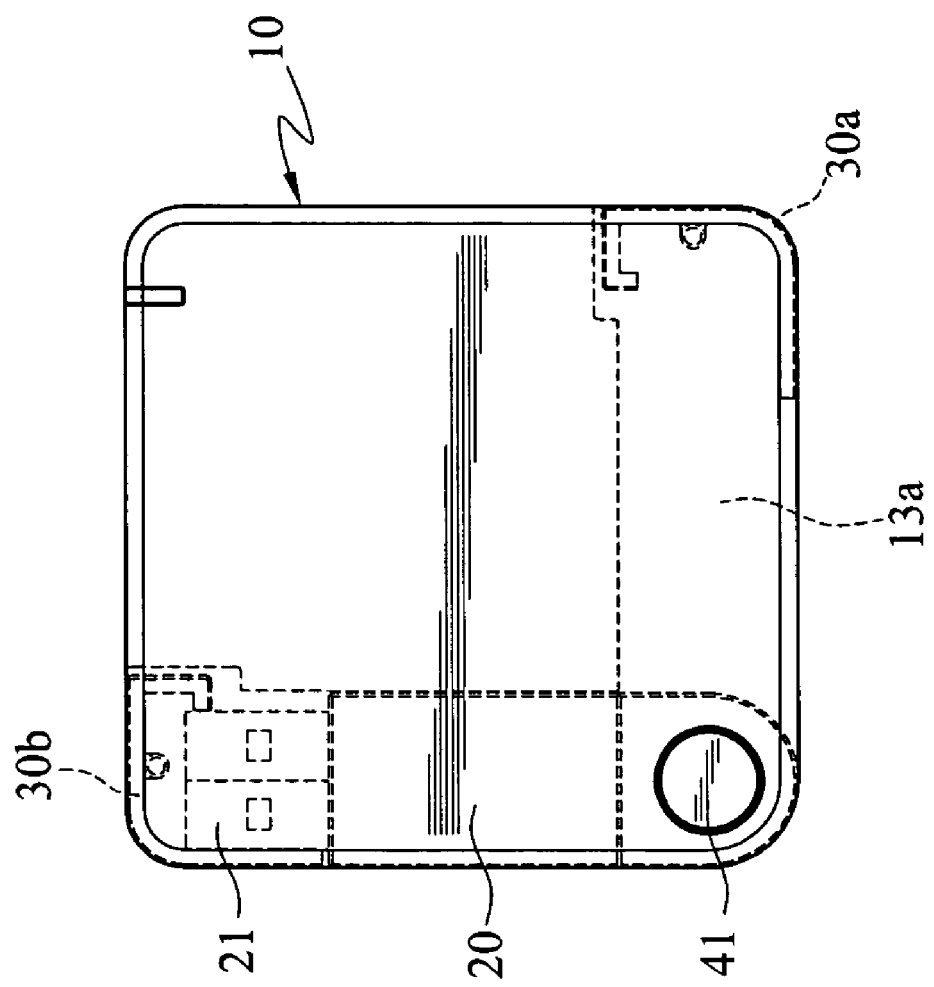

According to the first embodiment previously discussed, the housing compartment 13 is located on one side of the case body 10. Due to the restriction of the housing compartment 13, the connector 20 may be turned about 180 degrees, and the use range of the connector 20 is about 120 degrees. Refer to FIGS. 4A, 4B and 4C for a second embodiment of the invention. The housing compartment 13 is formed at two neighboring sides of the case body 10, namely, the housing compartment 13 is formed in an L-shape to become a first housing compartment 13a and a second housing compartment 13b that are connected to each other. The first housing compartment 13a and the second housing compartment 13b have respectively a cap plate 30a and 30b. The pivotal connecting location of the connector 20 is the same as the first embodiment. By means of the design of the second embodiment, the connector 20 can be selectively housed in the first housing compartment 13a and the second housing compartment 13b. Therefore the connector 20 can be turned about 270 degrees. And the connector 20 has a larger use range to enable users to alter the relative position of the case body 10 and the connector 20, according to requirements.

Figure 5:
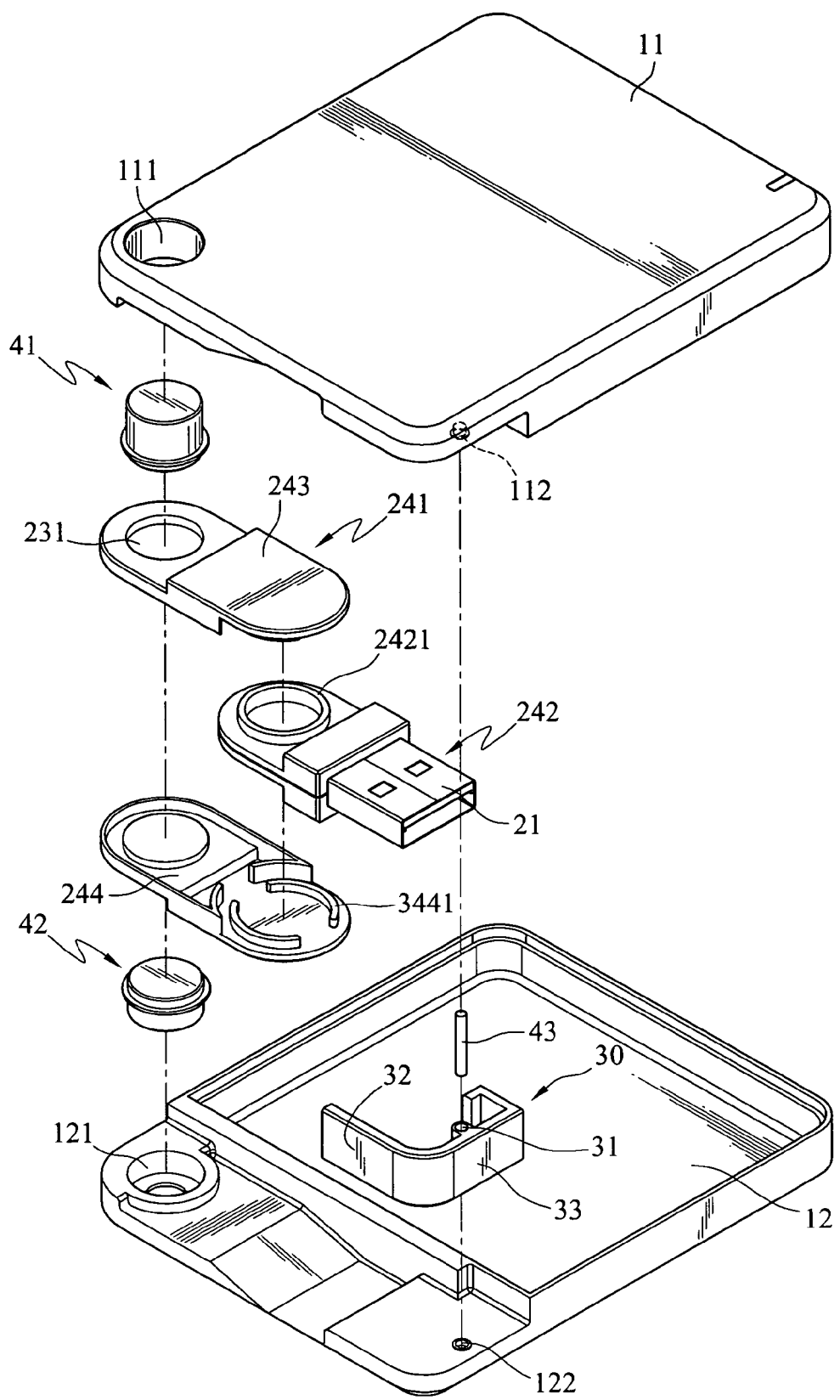
FIG. 5 is a schematic view of a third embodiment of the invention showing an exploded view of the connector.

In the first and second embodiments set forth above, the connector 20 is pivotally coupled on the case body 10 at the juncture of two neighboring sides in a turning manner. The pivotal coupling location of the connector 20 and the case body 10 are not at the center line of the case body 10, i.e. the connector 20 is located away from the gravity center of the case body 10. Refer to FIGS. 5 and 6A for a third embodiment of the invention. The connector 20 has a first rotary arm 241 and a second rotary arm 242. The pivotal connecting end 23 defined in the first embodiment is located on the first rotary arm 241. The electric plug 21 and the free end 22 defined in the first embodiment are located on the second rotary arm 242. The first and second rotary arms 241 and 242 have one end corresponding to each other and are pivotally coupled with each other in a turning manner. Thereby, the first rotary arm 241 can be turned about the axles 41 and 42, while the second rotary arm 242 can be turned about the first rotary arm 241. In practice, the first rotary arm 241 consists of an upper cap 243 and a lower cap 244. The upper cap 243 and the lower cap 244 have respectively an inner side facing each other, to form a coaxial arched wall 2441 (only the lower cap 244 is shown in the drawings, the upper cap 243 is formed in a corresponding manner). The second rotary arm 242 has an upper end and a lower end coupled with coupling rings 2421 corresponding to the arched wall 2441 (only the upper end is shown in the drawings, the lower end is formed in a corresponding manner). The coupling ring 2421 of the second rotary arm 242 is coupled on the arched wall 2441. When the upper cap 243 and the lower cap 244 are coupled, the second rotary arm 242 may be turned radically about the arched wall 2441. Moreover, the arched wall 2441 is designed in such a manner that the internal connection line of the connector 20 can pass through without hindering the turning movement.

Figure 6B:
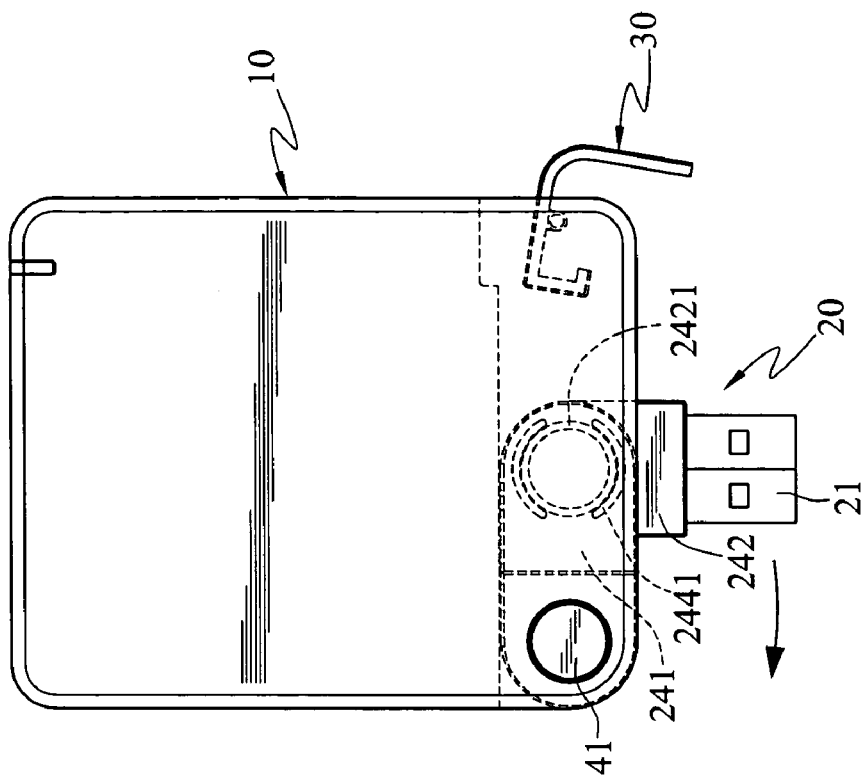
FIGS. 6A, 6B and 6C are schematic views of the third embodiment of the invention in operating condition.
Figure 6A:
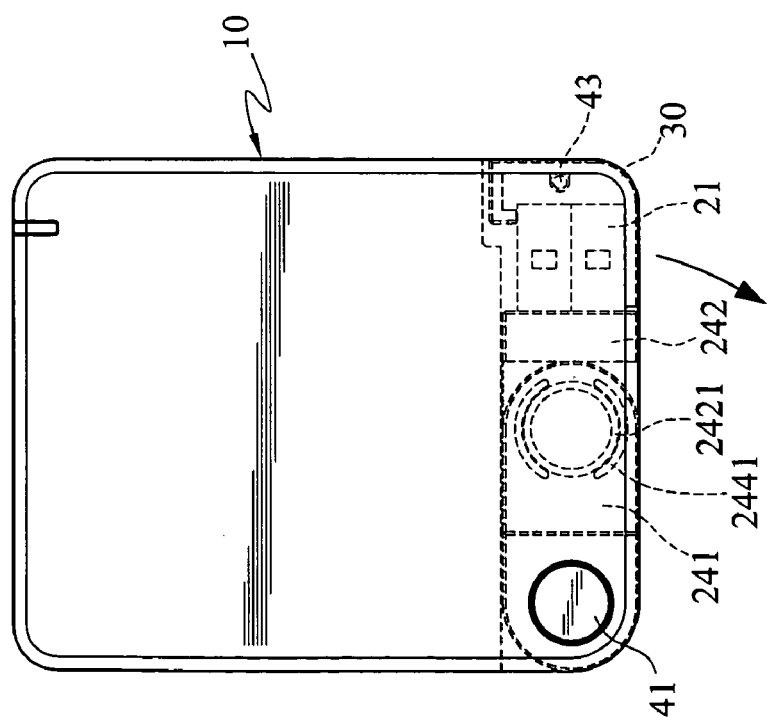
Figure 6C:
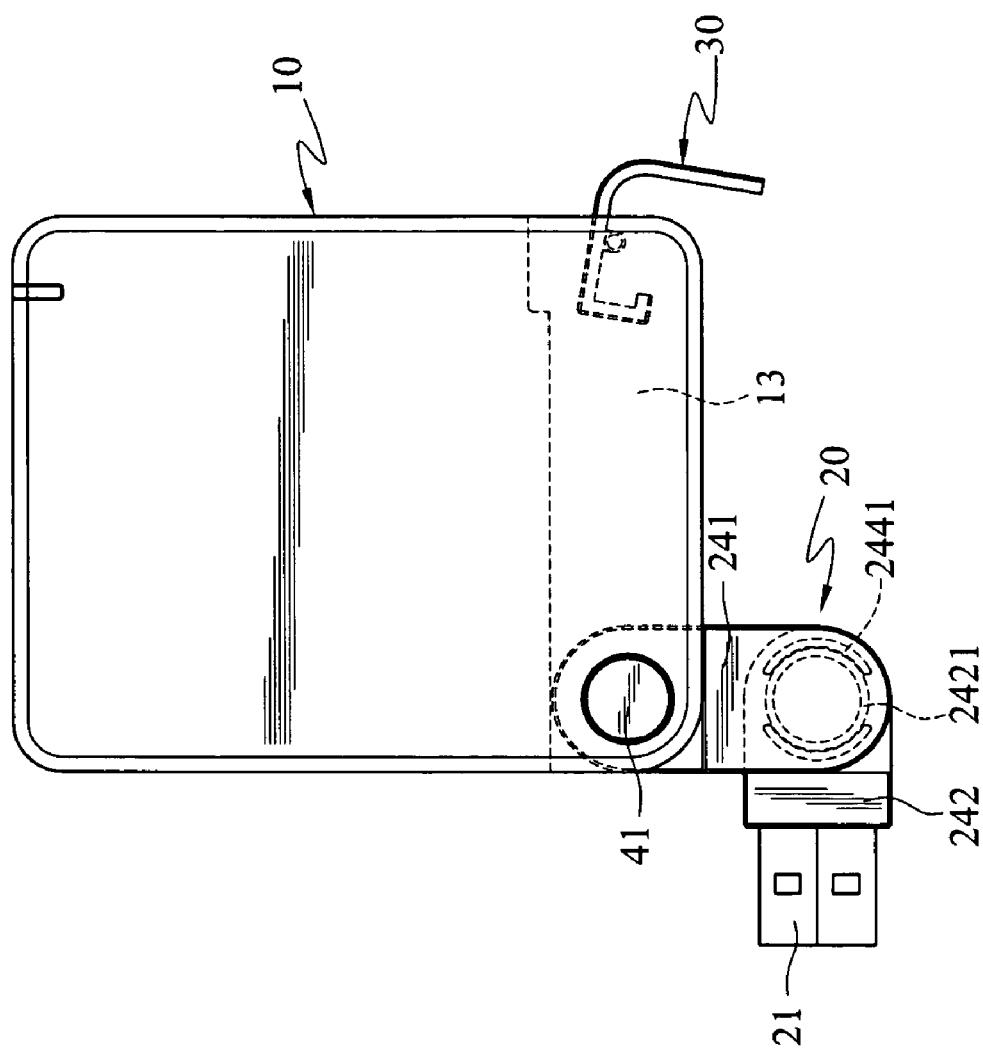

FIGS. 6A, 6B and 6C further depict the third embodiment. Besides moving the entire connector 20 to the use position as the first embodiment does, the first rotary arm 241 of the connector 20 can also remain in the housing compartment 13, while the second rotary arm 242 is moved out to the use position as shown in the drawings. The second rotary arm 242 is located on the centerline of the case body 10. When the electric plug 21 is inserted into the connection port of the computer, it can evenly bear the weight of the case body 10. In addition, the connector 20 has two rotation centers. Therefore, the connector 20 can have more versatile positions relative to the case body 10.

Figure 7:
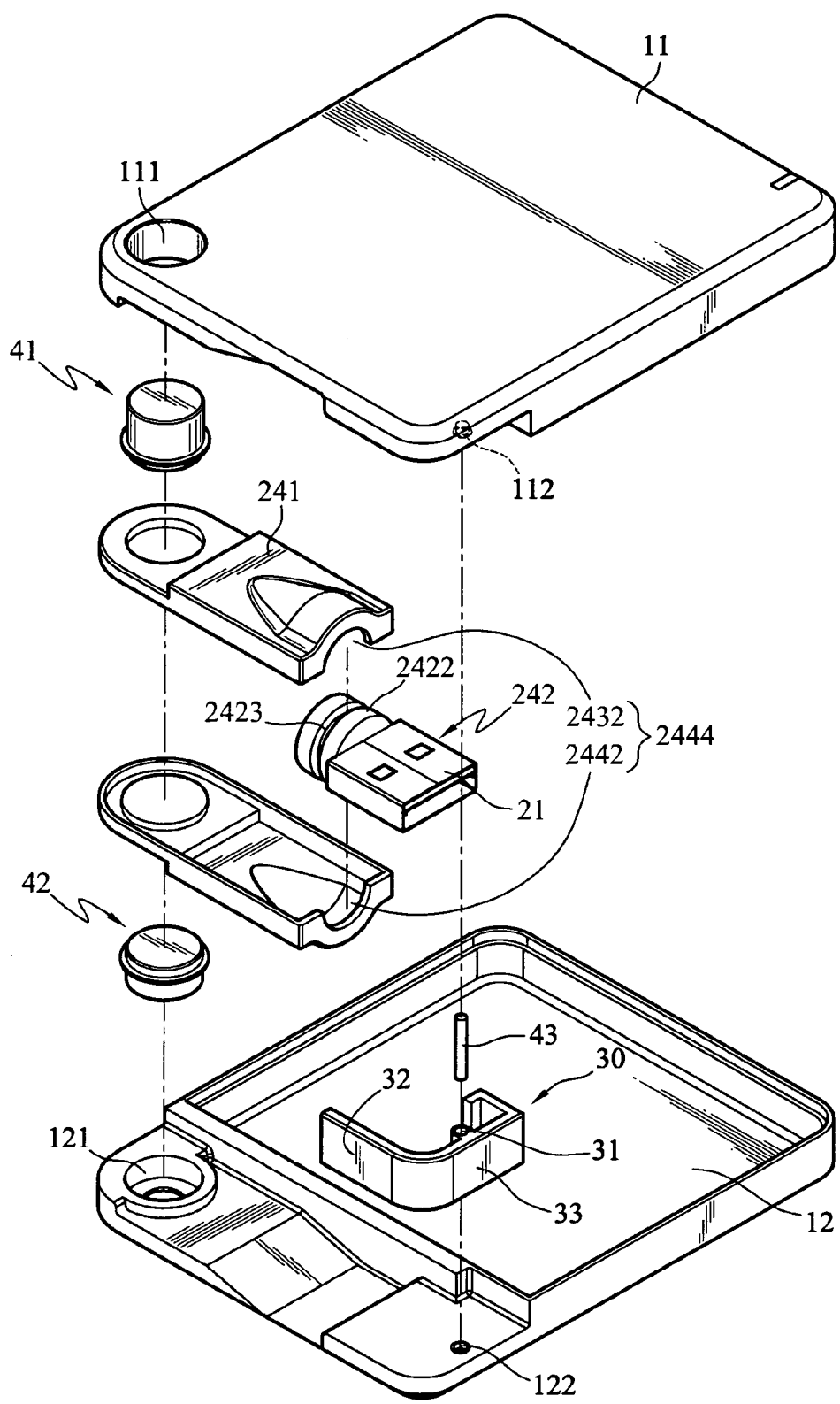
FIG. 7 is a schematic view of a fourth embodiment of the invention showing an exploded view of the connector.

Refer to FIG. 7 for a fourth embodiment based on the third embodiment set forth above. The upper cap 243 and the lower cap 244 at the front end of the first rotary arm 241 have respectively a semi-circular trough 2432 and 2442, to form a coupling port 2444. One end of the second rotary arm 242 corresponding to the electric plug 21 has a hollow round shaft 2422. The round shaft 2422 has an annular groove 2423 which can be coupled with the coupling port 2444 of the first rotary arm 241, so that the second rotary arm 242 can be turned axially relative to the first rotary arm 241.

Figure 8A:
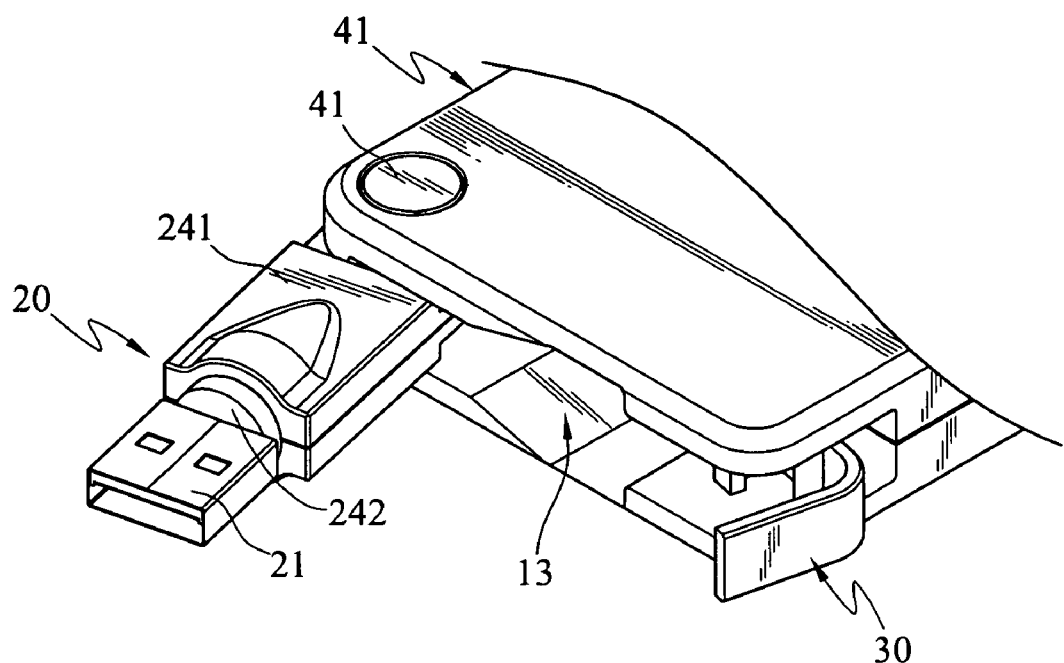
FIGS. 8A and 8B are schematic views of the fourth embodiment of the invention in operating condition.
Figure 8B:
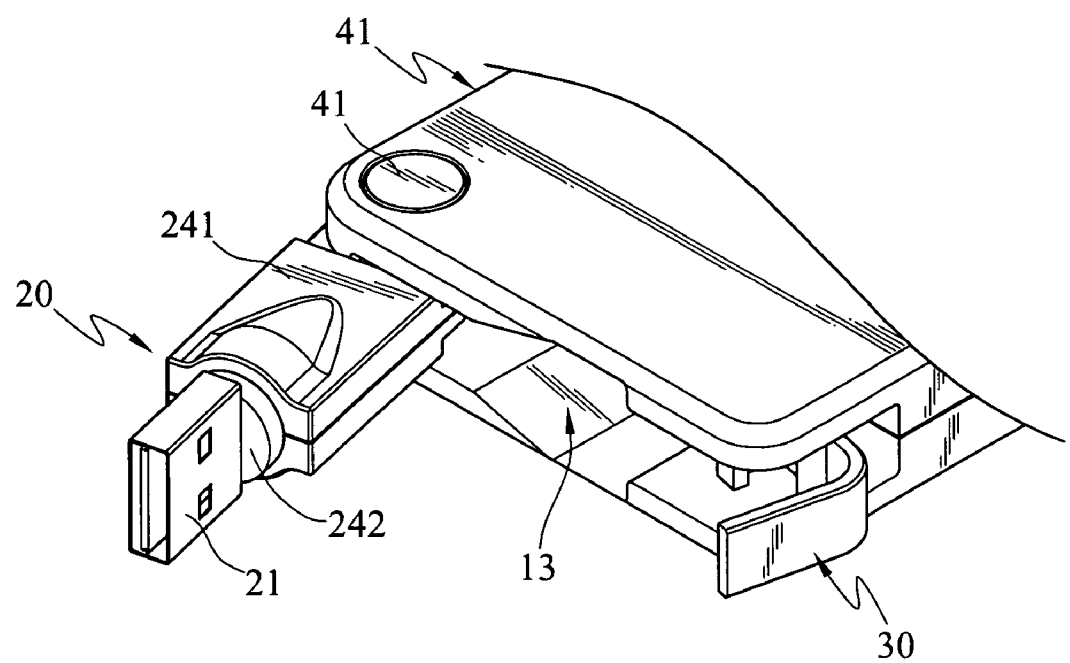

Refer to FIGS. 8A and 8B for the fourth embodiment of the invention in practice. Besides moving the entire connector 20 to the use position as the first embodiment does, at the use position, the second rotary arm 242 can be turned 360 degrees axially about the first rotary arm 241. So users can alter the relative position of the connector 20 and the case body 10 according to actual requirements.

Figure 9:
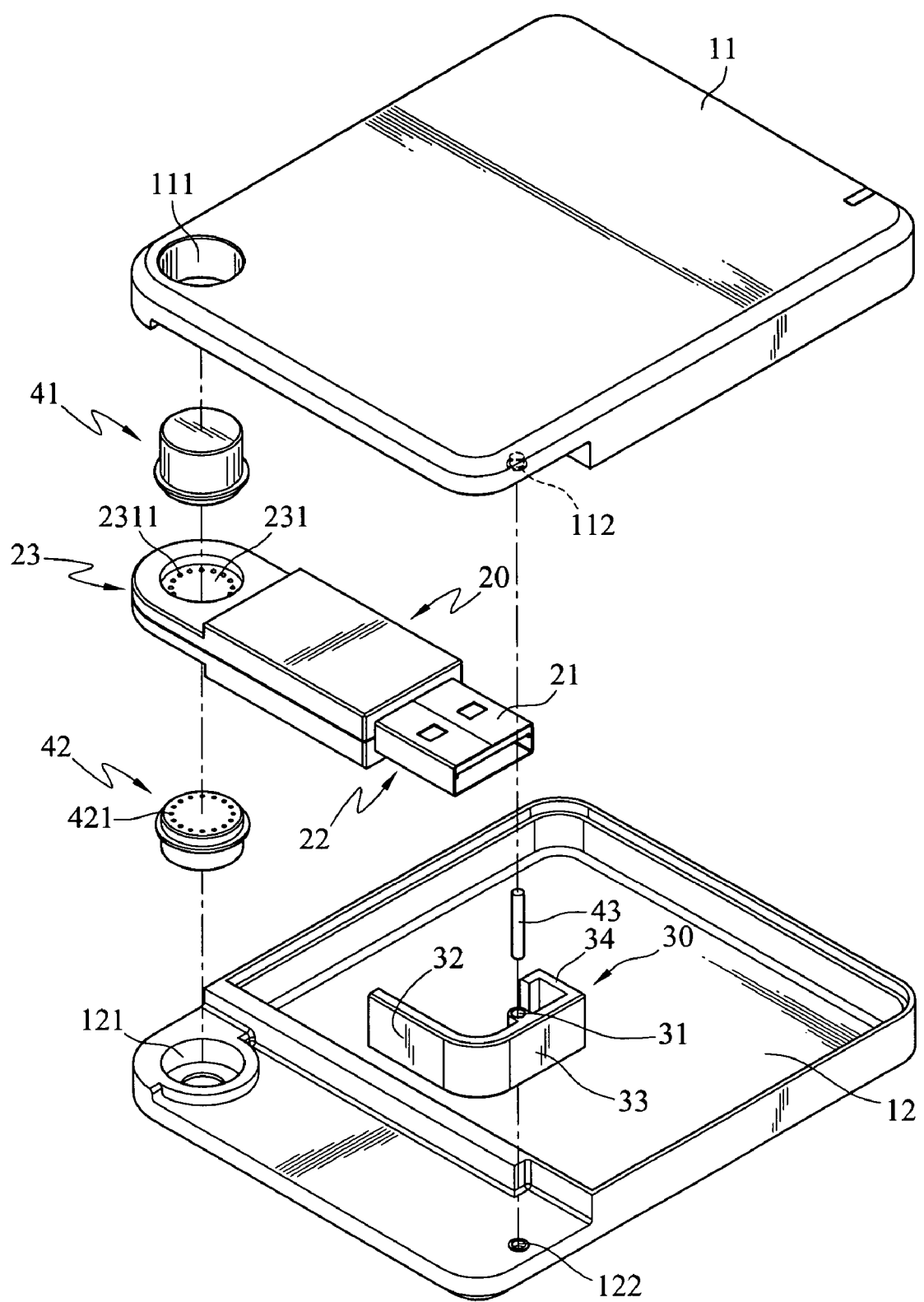
FIG. 9 is a schematic view of a fifth embodiment of the invention showing an axle and a connector.

In the first, second, third and fourth embodiments set forth above, the connector 20 is pivotally coupled on the case body 10 in a turning manner, and there is noother restriction between the connector 20 and the case body 10. Namely, the connector 20 can be turned freely. Refer to FIG. 9 for a fifth embodiment of the invention. The coupling trough 231 of the connector 20 has a plurality of anchor lugs 2311 formed in an annular manner (corresponding to the coupling trough 231). The axles 41 and 42 have anchor notches 421 corresponding to the anchor lugs 2311 (corresponding to the axle 41). Thereby, when the connector 20 is turned, the anchor lugs 2311 and the anchor notches 421 can match with each other to maintain the connector 20 at an adjusted position.

Figure 10:
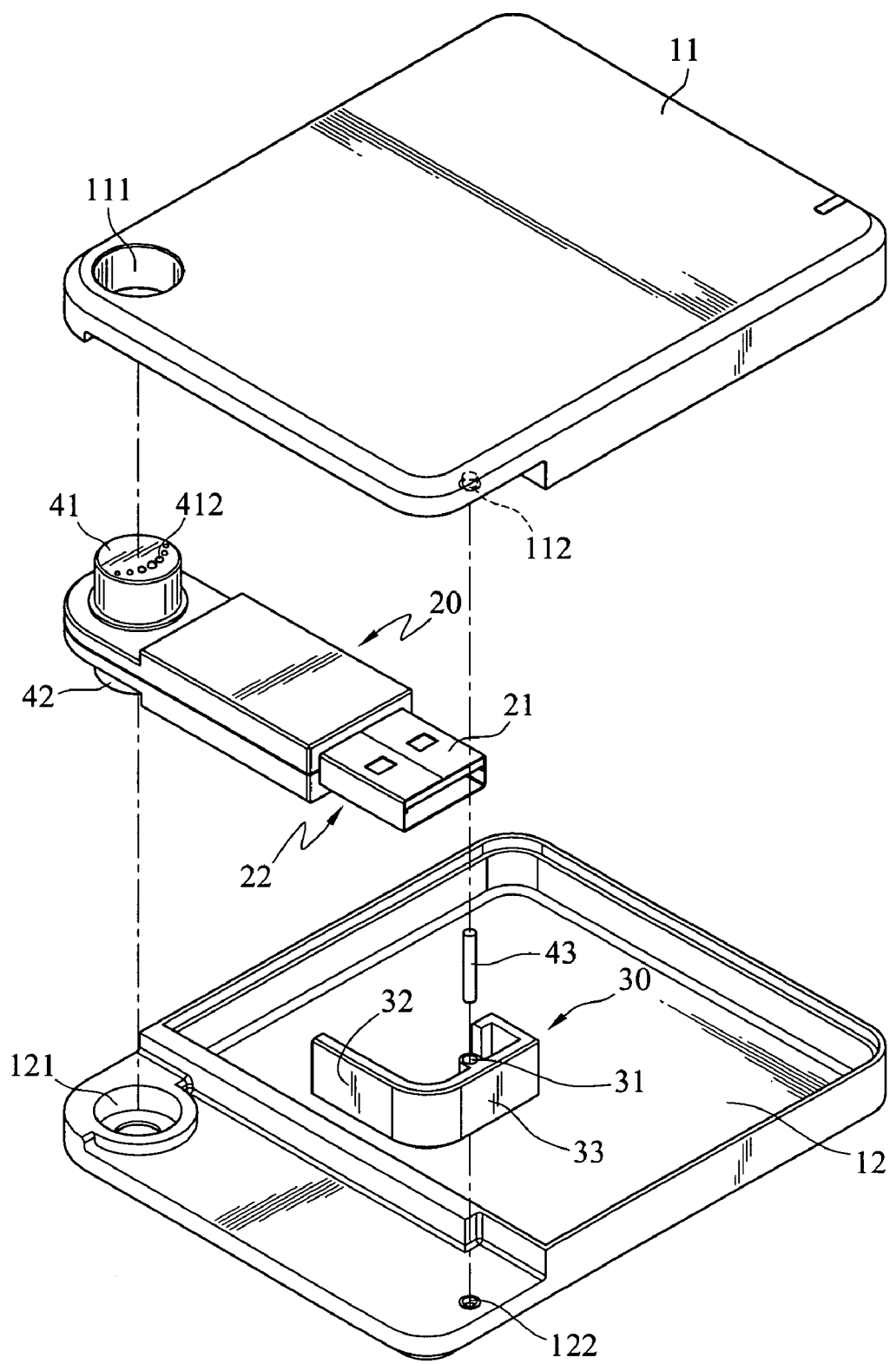
FIG. 10 is a schematic view of a sixth embodiment of the invention showing the connector.
Figure 11:
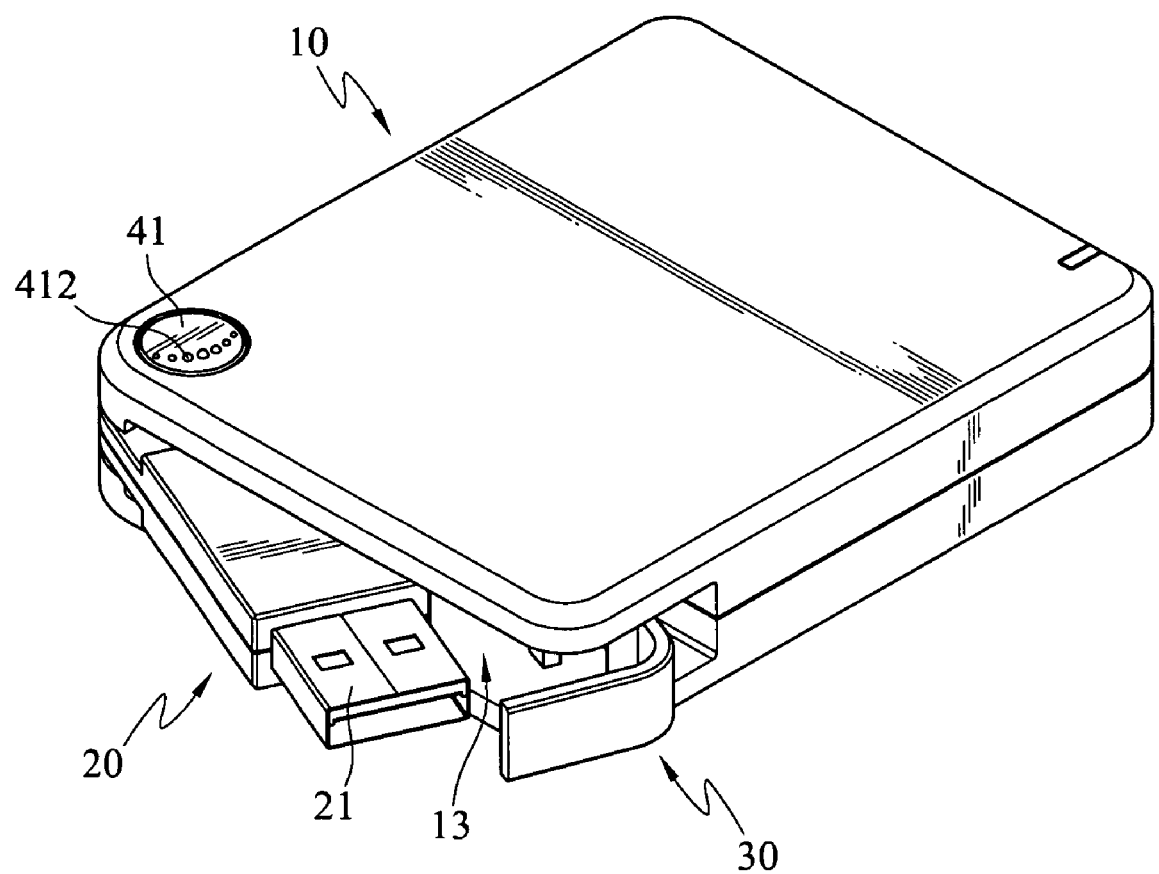
FIG. 11 is a schematic view of the sixth embodiment of the invention with the connector in operating condition.

Refer to FIGS. 10 and 11 for a sixth embodiment based on the first through fourth embodiments set forth above. The axles 41 and 42 are fixedly located on the connector 20. The top surface of the axles 41 and 42 have respectively a plurality of bucking members 412 arranged in an arched manner (corresponding to the axle 42). The bucking member 412 has two tapered ends and a large middle portion so that users can directly push the bucking members 412, to move the connector 20 between the hidden position and the connecting position.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An external connecting electronic apparatus, comprising:
    a case body for housing electronic elements that provide functions of the external connecting electronic apparatus having a housing compartment located on one side thereof;
    a connector connecting electrically to the electronic elements in the case body and being pivotally coupled on one end of the housing compartment in a turnable manner, and having a hidden position in which the connector being completely housed in the housing compartment and a connecting position in which the connector being turned outwards from the housing compartment to connect to a computer; and
    a cap plate pivotally coupled on another end of the housing compartment in a turnable manner corresponding to the connector having a masked position for covering the case body and an open position turned outwards;
    wherein the cap plate is movable from the masked position to the open position to push the connector moving from the hidden position to the connecting position, and the connector is movable from the connecting position to the hidden position to push the cap plate moving from the open position to the masked position.

2. The external connecting electronic apparatus of claim 1, wherein the case body includes an upper shell and a lower shell that have respectively a pivot hole corresponding to the pivotal coupling position of the housing compartment and the connector, the connector having a coupling trough on an upper side and a lower side thereof corresponding to the pivot hole, the pivot hole and the coupling trough being coupled with a pair of axles so that the connector is turnable about the axles.

3. The external connecting electronic apparatus of claim 2, wherein the upper shell and the lower shell have respectively a pivot seat corresponding to the housing compartment at another end corresponding to the pivot hole, the cap plate having a pivot hole to receive an axle for coupling on the pivot seat so that the cap plate is turnable about the axle.

4. The external connecting electronic apparatus of claim 2, wherein the coupling trough has a plurality of anchor lugs formed in an annular fashion, the axles having anchor notches corresponding to the anchor lugs so that the connector is restricted by the anchor lugs and anchor notches to be maintained at an adjusted position.

5. The external connecting electronic apparatus of claim 2, wherein the axles are fixedly located on the connector and have a plurality of bucking members located thereon in an arched fashion.

6. The external connecting electronic apparatus of claim 1, wherein the connector has a pivot end pivotally coupled on the case body and a free end with an electric plug located thereon.

7. The external connecting electronic apparatus of claim 1, wherein the cap plate is substantially formed in L-shape and has a first plate on one side and a second plate on other side, the first plate and the second plate covering the case body at the masked position, and the first plate being turned outwards from the housing compartment and the second plate being turned and moved into the housing compartment at the open position, and the second plate ramming and moving the connector when being moved to the open position.

8. The external connecting electronic apparatus of claim 1, wherein the connector has a first rotary arm and a second rotary arm pivotally coupled with each other in a turnable manner, the first rotary arm and the second rotary arm being movable together between the hidden position and the connecting position, and the second rotary arm being turnable relative to the first rotary arm when located between the hidden position and the connecting position.

9. The external connecting electronic apparatus of claim 8, wherein the second rotary arm is turnable radially relative to the first rotary arm.

10. The external connecting electronic apparatus of claim 8, wherein the second rotary arm is turnable axially relative to the first rotary arm.

11. An external connecting electronic apparatus, comprising:
    a case body for housing electronic elements that provide functions of the external connecting electronic apparatus having a first housing compartment and a second housing compartment located on two neighboring sides thereof;
    a connector connecting electrically to the electronic elements in the case body and being pivotally coupled in a turnable manner on a juncture of the first housing compartment and the second housing compartment, the connector having a hidden position in which the connector being completely housed in the first housing compartment or the second housing compartment, and a connecting position in which the connector being turned outwards from the first housing compartment or the second housing compartment to connect to a computer;
    a first cap plate pivotally coupled on another end of the first housing compartment in a turnable manner corresponding to the connector having a masked position for covering the case body and an open position turned outwards; the first cap plate being movable from the masked position to the open position to push the connector moving from the hidden position to the connecting position, and the connector being movable from the connecting position to the hidden position to push the first cap plate moving from the open position to the masked position; and a second cap plate pivotally coupled on another end of the second housing compartment in a turnable manner corresponding to the connector having a masked position for covering the case body and an open position turned outwards; the second cap plate being movable from the masked position to the open position to push the connector moving from the hidden position to the connecting position, and the connector being movable from the connecting position to the hidden position to push the second cap plate moving from the open position to the masked position.

12. The external connecting electronic apparatus of claim 11, wherein the case body includes an upper shell and a lower shell that have respectively a pivot hole corresponding to the juncture of the first housing compartment and the second housing compartment, the connector having respectively a coupling trough on an upper side and a lower side corresponding to the pivot hole, the pivot hole and the coupling troughs being coupled with a pair of axles so that the connector is turnable about the axles.

13. The external connecting electronic apparatus of claim 12, wherein the upper shell and the lower shell have respectively a pivot seat corresponding to the first housing compartment at another end corresponding to the pivot hole, the first cap plate having a pivot hole to receive an axle for coupling on the pivot seat so that the cap plate is turnable about the axle.

14. The external connecting electronic apparatus of claim 12, wherein the upper shell and the lower shell have respectively a pivot seat corresponding to the second housing compartment at another end corresponding to the pivot hole, the second cap plate having a pivot hole to receive an axle for coupling on the pivot seat so that the second cap plate is turnable about the axle.

15. The external connecting electronic apparatus of claim 12, wherein the coupling trough has a plurality of anchor lugs formed in an annular fashion, the axles having anchor notches corresponding to the anchor lugs so that the connector is restricted by the anchor lugs and the anchor notches to be maintained at an adjusted position.

16. The external connecting electronic apparatus of claim 12, wherein the axles are fixedly located on the connector and have a plurality of bucking members located thereon in an arched fashion.

17. The external connecting electronic apparatus of claim 11, wherein the connector has a pivot end pivotally coupled on the case body and a free end with an electric plug located thereon.

18. The external connecting electronic apparatus of claim 11, wherein the first cap plate and the second cap plate are substantially formed in L-shape and have a first plate on one side and a second plate on other side, the first plate and the second plate covering the case body at the masked position, and the first plate being turned outwards from the housing compartment and the second plate being turned and moved into the housing compartment at the open position, and the second plate ramming and moving the connector when being moved to the open position.

19. The external connecting electronic apparatus of claim 11, wherein the connector has a first rotary arm and a second rotary arm pivotally coupled with each other in a turnable manner, the first rotary arm and the second rotary arm being movable together between the hidden position and the connecting position, and the second rotary arm being turnable relative to the first rotary arm when located between the hidden position and the connecting position.

20. The external connecting electronic apparatus of claim 19, wherein the second rotary arm is turnable radially relative to the first rotary arm.

21. The external connecting electronic apparatus of claim 19, wherein the second rotary arm is turnable axially relative to the first rotary arm.

* * * * *